Nov. 1, 1949.   H. C. GRAVES, JR   2,486,596
TIME DELAY FOR SELECTIVE TRIPPING
Filed Oct. 19, 1945   6 Sheets-Sheet 2

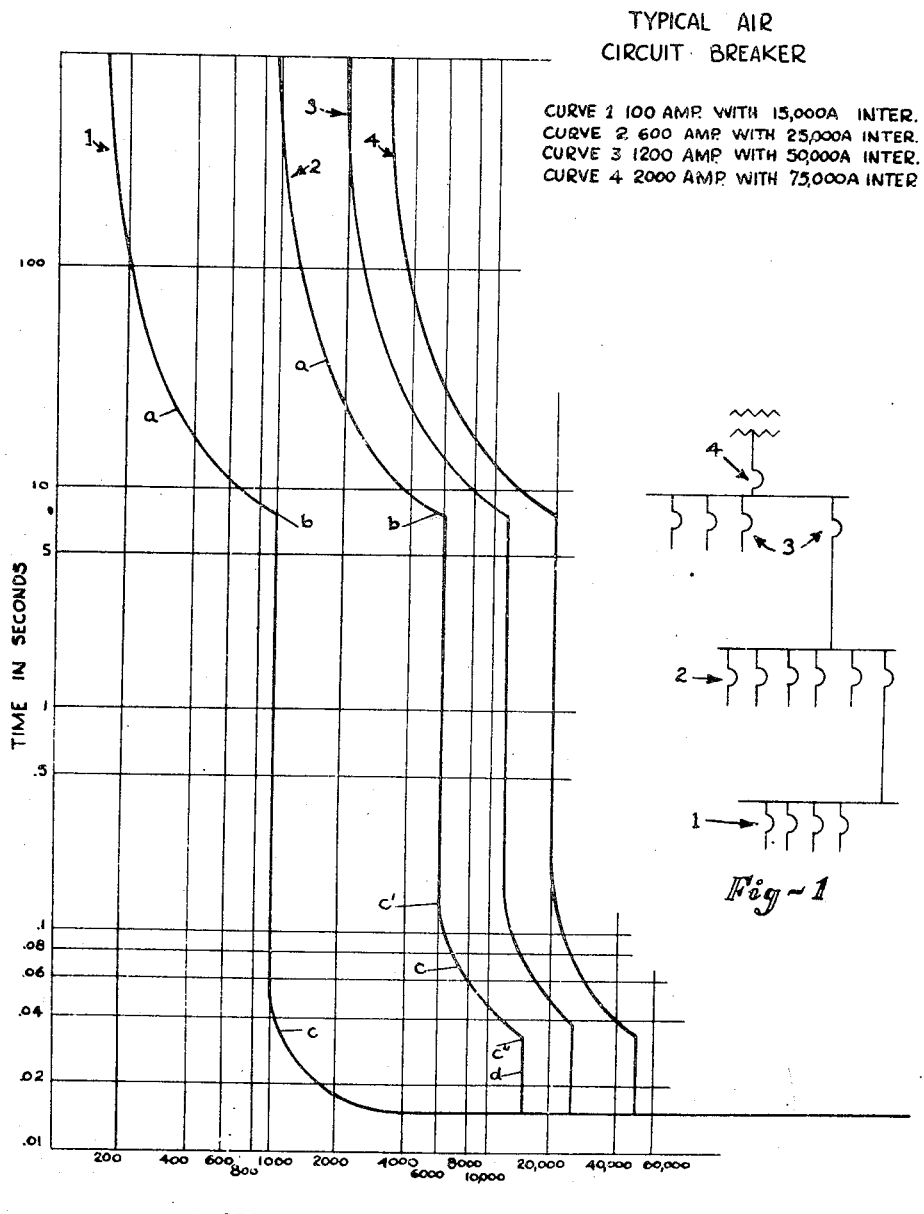

INVENTOR.
Herbert C. Graves, Jr.
BY Ostrolenk + Faber
ATTORNEYS

INVENTOR.
Herbert C. Graves, Jr.
BY Ostrolenk + Faber
ATTORNEYS

Nov. 1, 1949. H. C. GRAVES, JR 2,486,596
TIME DELAY FOR SELECTIVE TRIPPING
Filed Oct. 19, 1945 6 Sheets-Sheet 6
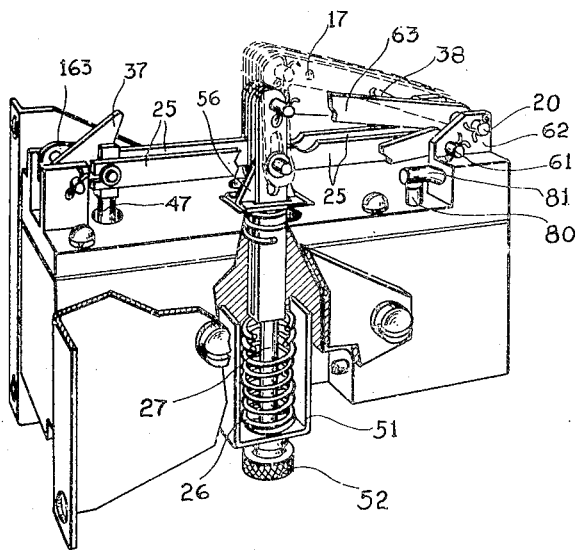
Fig. 8
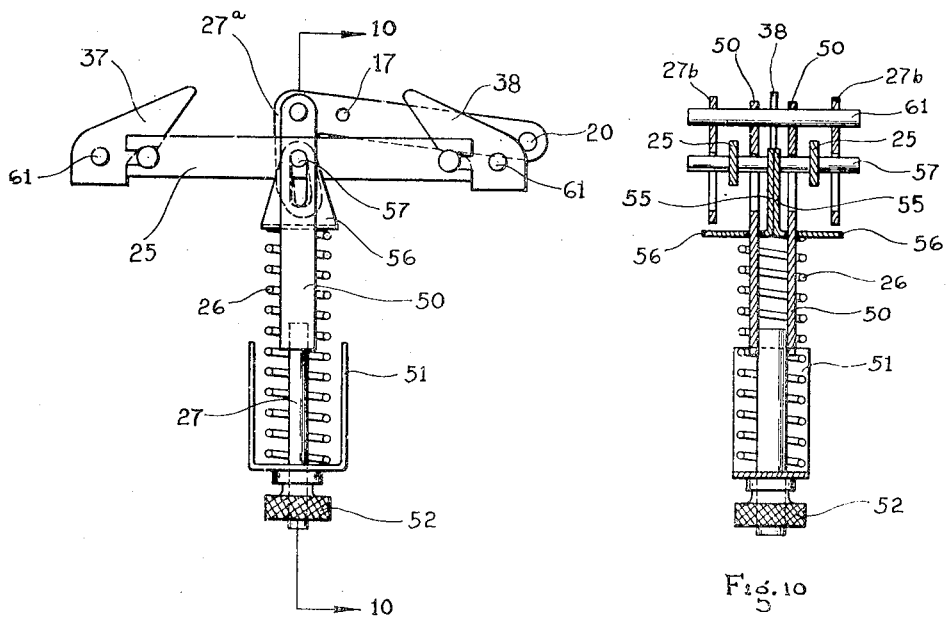
Fig. 9
Fig. 10
INVENTOR.
Herbert C. Graves, Jr.
BY
Ostrolenk & Faber
ATTORNEYS Patented Nov. 1, 1949

2,486,596

UNITED STATES PATENT OFFICE 2,486,596

TIME DELAY FOR SELECTIVE TRIPPING

Herbert C. Graves, Jr., West Chester, Pa., assignor to I-T-E Circuit Breaker Company, Philadelphia, Pa., a corporation of Pennsylvania Application October 19, 1945, Serial No. 623,367

3 Claims. (Cl. 175—372)

My invention relates to circuit breakers and more specifically to novel tripping devices therefor adapted to be used in a system of circuit breakers arranged for sequential tripping over the entire protective range of the circuit breakers including the short circuit current ranges.

More specifically, my invention relates to a novel tripping device provided with direct acting overload elements which may be adjusted to secure sequential tripping with respect to other breakers in the system.

In distribution systems within, for instance, a large industrial plant, the power enters the plant through a main circuit breaker to the main distribution switchboard and is there fed out on a number of feeder circuits each protected by a circuit breaker. These feeders may each go to large loads. Some, or all, however, may go to additional distribution switchboards where they are again divided into smaller distribution circuits. Each of these circuits may in turn go to load centers or power panels for distribution of the energy to a multiplicity of loads.

Distribution systems of this type (of which a simplified diagrammatic illustration is hereinafter shown in the figures) are utilized not only in most industrial plants, but also wherever a large quantity of apparatus in a relatively compact unit must be operated from a central power source.

In such distribution systems, the fault current due to fault or short circuit conditions in one of the feeder circuits, or even in one of the load circuits, passes through several breakers in series and may result not merely in a tripping of the circuit breaker protecting that particular load, but in a tripping of each of the circuit breakers back of and in series with that particular circuit breaker back to the source, so that one of the main feeder breakers, or even the main breaker itself, may be tripped and thus disconnect the entire distribution system.

Accordingly, the primary problem to which this invention is directed is the construction and arrangement of such circuit breakers in a distribution system in such a novel manner that high speed selective tripping will occur, and so that the circuit breaker nearest the fault will be operative to clear an overcurrent, fault, or short circuit condition on the particular circuit it is protecting before the circuit breakers between it and the source can complete a tripping operation, and so that each circuit breaker in the system will be protected by the circuit breaker immediately behind it toward the source.

More specifically, I have invented a novel tripping device peculiarly adapted for use in a system in which the overload mechanisms of the circuit breakers in the system are so adjusted that the smallest circuit breakers for protecting the individual loads have a higher speed trip characteristic than other breakers in series with them, up to their maximum interrupting capacity. At or below maximum interrupting capacity of these load breakers, the adjustment of the overload mechanism of the adjacent circuit breaker in series with the load unit breaker (toward the source) becomes quick acting to trip its associated circuit breakers quickly and therefore protects the smaller load breaker. The overload mechanism of this adjacent circuit breaker is in turn adjusted to trip its associated breaker faster than the next circuit breaker (toward the source) in the series circuit thereby preventing tripping of this next circuit breaker at short circuit values approximately up to or below the maximum interrupting capacity of the preceding circuit breaker. This last circuit breaker is, in turn, tripped substantially instantaneously at short circuit currents of values substantially equal to or below the maximum interrupting capacity of the circuit breaker adjacent it toward the load.

In sequential tripping systems heretofore employed, the time separation between the various circuit breakers in the system has been effected by the provision of relays which have been set to various time delays and which, on operation, energize the shunt trip coils. Such systems are either very expensive and involved or can only provide sequential operation by timed intervals in the range of seconds since it is necessary in such a system that the relay first be energized sufficiently long to pull up its armature to close its contacts. When the armature has been moved to the energized position, and then only, does it energize the shunt trip coil which in turn must operate a second armature to operate the trip mechanism. Where instantaneous features were added, as was often the case, all circuit breakers in the sequence would open thus losing continuity of service.

I have discovered that I can secure sequential tripping of circuit breakers in a power system not only in the overload current ranges such as may occur in motor starting circuits, but also in the range of short circuit currents where the tripping must be substantially instantaneous.

This I effect by providing overload devices having an inverse time ratio which may substantially simulate the heating conditions of a load such as a motor to provide a time delay trip for the protection of such a load. This is followed by a quick trip protection at greater overload conditions such as at two to ten times the overload value of the particular breakers with a short inverse time or definite minimum time characteristic. In addition, a more definite ratio can be obtained by saturation of the magnetic circuit in the overload device.

Finally there is provided an instantaneous trip mechanism individual to each of said breakers. This latter is so arranged with respect to each of the other circuit breaker trip curves that each of the larger breakers (in a cascaded system) has substantially the same instantaneous tripping time as the next smaller breaker at the interrupting capacity of that smaller breaker.

At less than this interrupting capacity each of the quick trip mechanisms, however, has a slightly slower tripping operation measurable in terms of a few cycles than the next smaller circuit breaker so that sequential tripping is still effected in such a short circuit current range close to maximum interrupting capacity of the breakers of the system.

A primary object of my invention, therefore, is the provision of a novel tripping device for a circuit breaker which will be selectively responsive at different speeds to different types of overload and short circuit.

Another object of my invention is the provision of a time delay device for a circuit breaker tripping mechanism wherein a single unitary time delay element may be provided with a plurality of independent adjustments for various time delays under different loads.

Still another object of my invention is the provision of a novel time delay device for the tripping elements of a circuit breaker which will adapt the circuit breaker for use in a sequential tripping system of the character above set forth.

Another object of my invention is the provision of a time delay device arranged to have characteristic curves for protecting normal overloads, such as starting current in motor circuits, while at the same time it has other characteristic curves for protection against various more excessive loads up to and including short circuits.

Another object of my invention is the provision of a novel time delay device for use in connection with tripping elements of circuit breakers arranged in a sequential tripping system in which both long time delay periods and quick trip operating periods are obtainable.

In a preferred form of my invention, the time delay device comprises essentially a walking beam arrangement, the center of which is connected to the circuit breaker armature by a powerful compression spring which acts for instantaneous tripping purposes as hereinafter described, one end of the beam being connected to a relatively long time delay dashpot, the other end being connected to a relatively short time delay dashpot.

Under normal overloads, the end of the beam which is connected to the relatively long time delay dashpot is freed to move but is held back to allow for the long time delay interval. Under heavy overload conditions, the opposite end of the beam is freed but its movement is subjected to the relative short time delay of another dashpot.

The first mentioned dashpot provides a time delay of the order of seconds, while the second dashpot provides the quick trip time delay of a few cycles. Under extremely heavy currents or short circuits, the spring between the armature and the center of the beam is compressed and the armature may then move free of the beam and of the dashpots connected thereto to provide for instantaneous tripping.

The foregoing and many other objects of my invention will become apparent from the following description and drawings in which:

Figure 1 is a schematic diagram of a group of circuit breakers in a typical distribution system.

Figure 2 is a graph showing the tripping characteristics of each of the circuit breakers in the group.

Figure 8 is a detail of the connection between the quick trip spring of Figure 4 and the arm which in turn is connected to the armature.

Figure 9 is a partially schematic side view of my invention with most of the device cut away to show the relation between the walking beam and the quick trip spring.

Figure 10 is a somewhat exploded section view taken along line 10—10 of Figure 9 looking in the direction of the arrows.

Referring now to Figures 1 and 2, I have here shown a typical distribution system having a plurality of circuit breakers together with a graph showing the tripping characteristics thereof. In this distribution system, the electrical energy is distributed at a utilization voltage of 440 volts, the various interrupting capacities for each of the breakers are shown in the curves.

The power enters the main plant by the circuit breaker 4, and then passes to a main distribution switchboard whence it is fed out on a number of feeder breakers 3. These feeders may each go to large loads. Some, or all, however, may go to additional distribution switchboards where they are again divided into a plurality of small distribution circuits to which energy is fed out over the circuit breakers 2. Each of these circuits may in turn go to load centers or power panels for distribution of the energy over the circuit breakers 1 to a multiplicity of loads.

Figure 3:
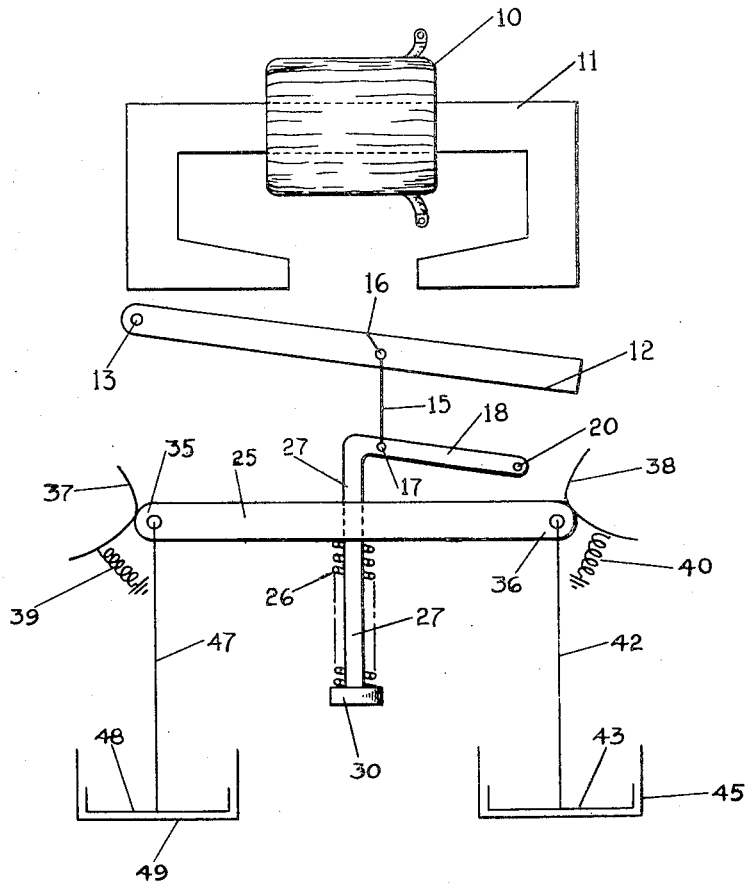
Figure 3 is a schematic view illustrating the operation of my novel time delay mechanism.

Referring first to Figure 3, wherein my time delay device is shown schematically, the circuit breaker trip magnet comprises a series trip coil 10 which energizes a magnet 11. Armature 12 is pivotally mounted on the stationary pivot 13 for attraction by the magnet 11 when suitably energized. A link 15 is pivotally connected at one end 16 to the armature 12 and at the other end 17 to the arm 18 which in turn is pivotally mounted on the stationary pivot 20.

Arm 18 is connected to approximately the center of the beam 25 through the compression spring 26; that is, the arm 18 has a downward extension 27 passing through the center of the beam 25, the said beam 25 being preferably a double member which is cross-raced in any suitable manner. The extension 27 beneath the beam 25 terminates in the flange 30.

The compression spring 26 is captured between the upper surface of the flange 30 and the lower surface of the beam 25. It will thus be seen that any upward movement of the armature 12 will result in upward movement of the arm 18 in a clockwise direction about its pivot 20 to draw up the extension 27 of the arm, thus drawing up the flange 30. This will drive the spring 26 upwardly to force up the beam 25.

For all current conditions less than short circuit or predetermined high current values, the spring 26 is incompressible so that the connection between the arm 18 and the beam 25 is a rigid one. At predetermined high current values or short circuit values, the spring 26 is adjusted so that it will be compressed and so that the arm 18 and hence the armature 12 will move upwardly without necessarily moving the beam 25 upwardly.

The ends 35 and 36 of the beam 25 are restrained respectively by latch members 37 and 38, which latch members are biased against the said ends 35, 36 by the respective springs 39, 40. The end 36 of beam 25 is connected by the link 42 to the piston 43 of the dashpot 45. The end 35 of the beam 25 is connected by the link 47 to the piston 48 of the dashpot 49.

Dashpot 45 is a long time delay dashpot and spring 40 is adjusted so that it will be extended and the end 36 of the beam 25 may move free of the latch 38 at relatively low current values such as 100 to 200% normal. When the end 36 of the beam 25 is thus released, the attraction of the armature 12 by the magnet 11 will cause the beam to rotate counterclockwise about the end 35 as a pivot.

The long time delay afforded by the dashpot 45 will, however, retard the movement of the end 36 of the beam for a substantially long time interval corresponding to section a of curve 2 of Figure 2.

Should the magnet 11, instead, be energized by a high current passing through the coil 10 of sufficient strength to cause the armature 12 to pull up the beam 25 with force sufficient to extend the spring 39, that is, should the condition correspond to that shown at section c of curve 2 of Figure 2, then the spring 39 is extended to release the latch 37 and permit the end 35 of the beam to move upwardly and to pull up the piston 48 of the dashpot 49.

Dashpot 49 is calibrated for a time delay of the order of minute fractions of a second or in cycles corresponding to portion c of curve 2 of Figure 2. Thus in this case, the beam 25 will rotate upwardly clockwise around the end 36 as a pivot since the dashpot 45 will not permit any appreciable movement of the end 36 to occur within the space of just a few cycles.

The circuit breaker will thus be tripped after an extremely short time delay as determined by the setting for the dashpot 49.

When extremely heavy currents of predetermined value or short circuit currents occur then the spring 26 is compressed and the armature 12 and the rotating arm 18 may now move free of the walking beam 25 and of the dashpots 45 and 49 to provide for the instantaneous trip indicated at the horizontal line at approximately .016 second in Figure 2.

Figure 4:
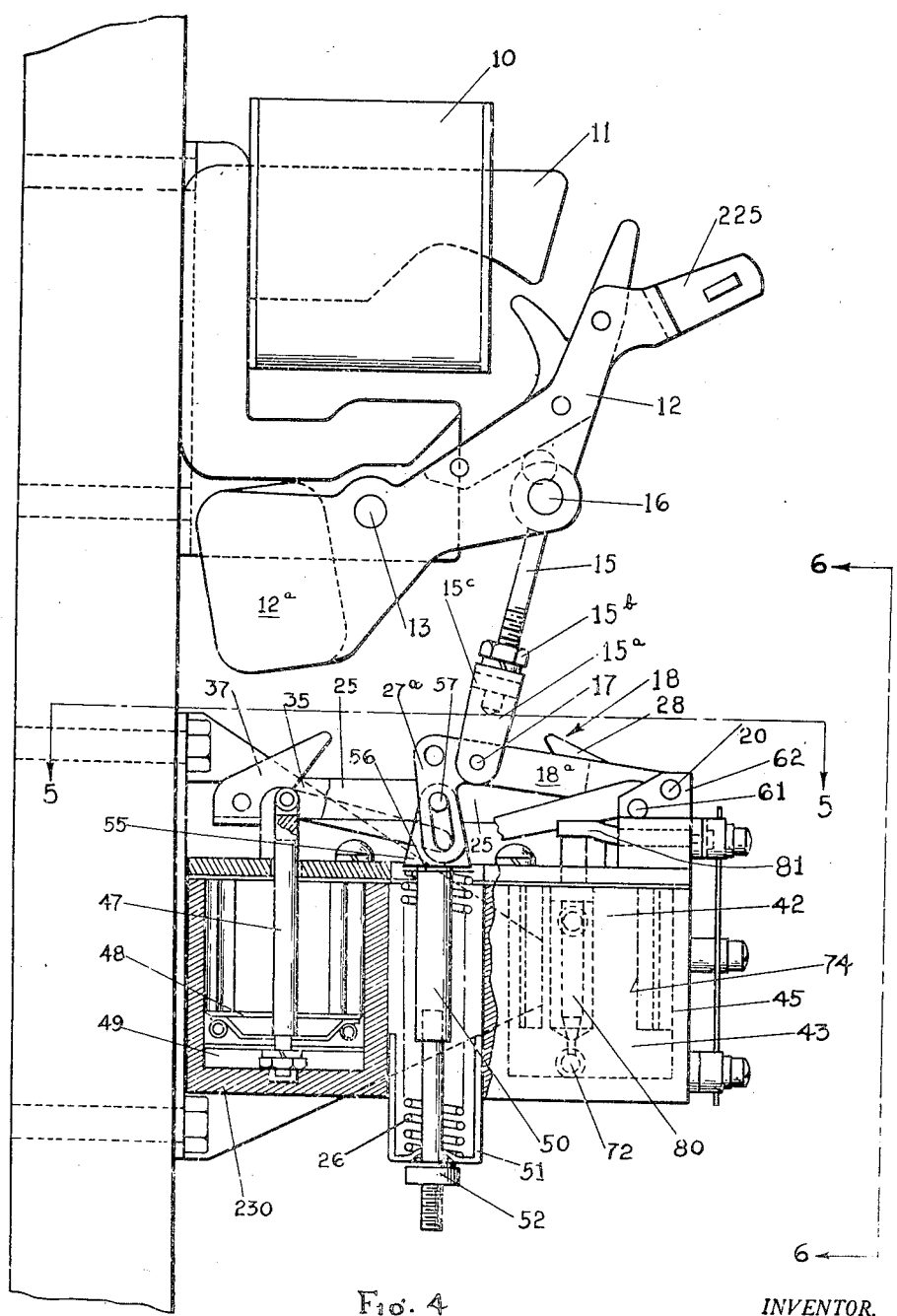
Figure 4 is a side view partly broken away of my novel time delay mechanism.
Figure 5:
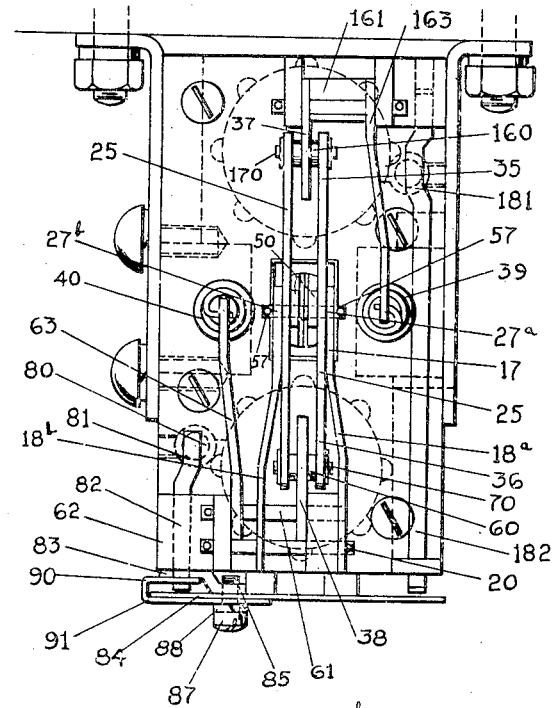
Figure 5 is a top view taken from line 5—5 of Figure 4.
Figure 6:
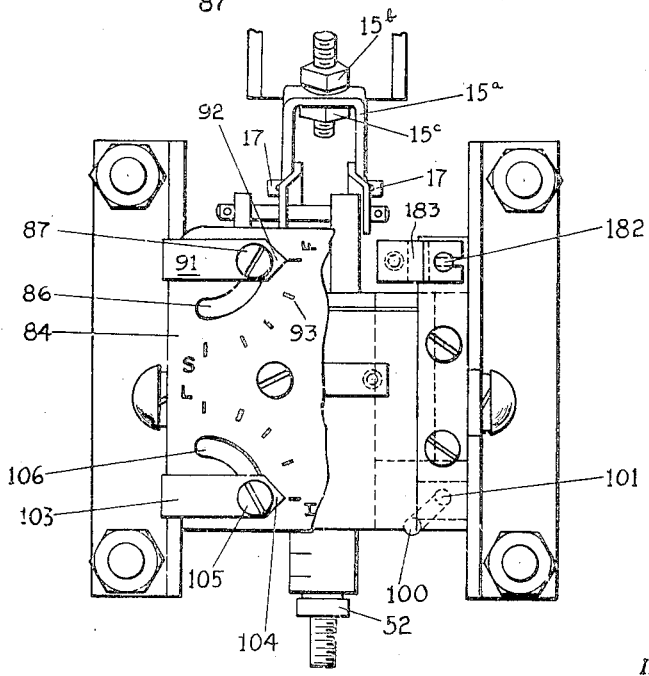
Figure 6 is a front view taken from line 6—6 of Figure 4.

In Figures 4, 5 and 6 I have shown a specific practical embodiment of my novel invention which has been expressed schematically in Figure 3. The series trip coil 10 of Figure 4 corresponds to the similarly numbered series trip coil 10 in Figure 3. This coil energizes the magnet 11 of Figure 4 which acts to attract the armature 12, the armature being pivoted at 13. Armature 12 is counterbalanced to prevent undesired movement thereof under physical shock and is thus provided with counterweight 12a.

Link 15 of Figure 4 connected at 16 to the armature 12, is an adjustable link provided with the adjustable clevis 15a, the position of which may be adjusted by the nuts 15b and 15c along the threaded end of the link 15. The clevis 15a carries the pin 17 which is secured to the arm 18, the said arm 18 being rotatably supported on the cross pin 20 corresponding to the pivot 20 of Figure 3.

The arm 18 is a double arm comprising the sections 18a and 18b and having the respective downward extensions 27a and 27b.

The extensions 27a and 27b are, as shown in Figures 8, 9 and 10, connected to the adjustable rod 50 which carries the spring cup 51 at its lower end, the position of the cup 51 and hence the force of the spring 26 being adjustable by means of the nut 52. Two angular pieces 55—55 (Figure 10), having horizontal members 56—56, are secured by the pin 57 to the beam 25. A compression spring 26 is captured between the base of the cup 51 and the underside of the horizontal members 56—56.

Accordingly, when the rotatable arm 18 is pulled up, pulling up extensions 27a and 27b, the adjustable bar 50 is pulled up thus pulling up the cup 51. This pulls the lower end of spring 26 up and forces the upper end of the spring against the underside of the horizontal members 56—56 of the angular pieces 55—55, thus pushing up on the pin 57 and pushing up the center of the beam 25.

If the current which attracts the armature 12 is of a predetermined high value or a short circuit current, the spring 26 is compressed, arm 18 may thus move up free of the beam 25, and link 15 and armature 12 may move upwardly to the trip position.

Should the attraction of the armature 12 be at a predetermined low value (for instance, along the section a of curve 2 of Figure 2), then the end 36 of the beam 25 will rise pivoting around the end 35 of the beam 25 with the spring assembly for compression spring 26 moving upwardly with the beam 25.

The end 36 of beam 25 is provided with a roller 60 engaged by the latch 38. Latch 38 is mounted on the cross shaft 61, supported in the bearing 62 at the front of the time delay device, one end of the cross shaft having keyed thereto the arm 63. Arm 63 is connected to the upper end of the tension spring 40, the lower end of which is held by suitable tension adjusting mechanism hereinafter pointed out.

Spring 40 is adjusted so that it will permit the roller 60 at the end 36 of beam 25 to lift the latch 38 and thus rotate the latch 38 and arm 63 upwardly at current values between 1 to 2 times normal, corresponding to the upper portion of section a of curve 2 of Figure 2. When the end 36 including roller 60 is thus freed of the latch 38, it is subjected to the time delay of dashpot 45.

The pivot 70 for roller 60 at the end 36 of the beam 25 is also connected to the vertical link 42. Link 42 is connected to the movable piston 43 of dashpot 45. The orifice 72 in dashpot 45 is extremely small permitting only gradual displacement of oil and thus providing a long time delay shown by section a of curve 2 of Figure 2.

After the piston 43 has moved upwardly a predetermined distance, it reaches the section of the dashpot 45 which is provided with a plurality of grooves 74. This now permits a freer displacement of the oil. Thus the piston 43 of dashpot 45 originally moves with the long time delay characteristic above pointed out but after movement to a predetermined degree, when it reaches the grooves 74, it permits the end 36 of the beam to move freely and thus permits the armature 42 to close quickly with the magnet 11.

This free movement occurs, of course, only if the low overcurrent condition has continued for the predetermined length of time.

The end 35 of the walking beam 25 is also provided with the roller 160. This roller is engaged by the latch 37 mounted on the cross shaft 161, which in turn carries the arm 163. Arm 163 is connected to the upper end of tension spring 39, the lower end of which is adjustable as hereinafter pointed out.

The pin 170 which carries the roller 160 at end 35 of beam 25 is also connected to the link 47 which in turn is connected at its lower end to the piston 48 of dashpot 49. The internal construction of dashpot 49 is similar to that of dashpot 45 except that the orifice provided therein is a larger one permitting more rapid displacement of oil and hence a shorter time delay. This orifice is adjusted to provide a time delay of the order of a few cycles and thus permits a time delay corresponding to section c of curve 2 of Figure 2.

The spring 39 is also adjusted so that it is a more powerful spring than the spring 40 and is so arranged that the latch 37 will be displaced to permit the end 35 of beam 25 to rise at currents above 10 times normal. When the end 35 of beam 25 is thus released, the beam pivots about the end 36 lifting up the entire spring assembly for the compression spring 26 without, however, compressing the spring 26. It will be obvious that although the spring 40 has also been extended to permit the end 36 of the beam 25 to rise, owing to the relatively large longer time delay provided by dashpot 45 for the end 36 of beam 25, the end 36 is for all purposes stationary with respect to the more rapidly moving end 35 of beam 25.

The time delay for currents above 10 times normal thus depends solely on the dashpot 49.

When, with respect to curve 2 of Figure 2, the point c is reached (an overcurrent value of 150 times normal as shown on this curve), then the spring 26 is subjected to sufficient force to compress the same. The armature 12, link 15, and the arm 18 as well as the rod 50 may now rise compressing the spring 26 and move independently of the beam 25 and of any time delays provided by dashpots 49 and 45. Thus the instantaneous trip value shown at the horizontal line along the .016 second portion of Figure 2 will occur.

By this means, therefore, the time delay device herein shown may readily be used in cascaded or sequential systems of the type shown in Figure 1 with circuit breakers 3 protecting the circuit breakers 2 and circuit breakers 2 protecting the circuit breakers 1 in the manner previously pointed out.

The orifice 72 of dashpot 45 may be adjusted by the plunger 80 connected to the bent portion 81 of the shaft 82. Shaft 82 is also carried in the bearing block 62 and projects therefrom to be engaged by the crank arm 83. Crank arm 83 passes behind the face plate 84 of the time delay device and is provided with a bolt 85 projecting through an arcuated slot 86 in the face plate 84, the bolt terminating in the head 87 and being locked in place by the spring washer 88.

In adjusting the orifice 72, the bolt 87 is rotated to loosen it and then is moved along the slot 86 to rotate the shaft 82 to rotate the bent portion 81 to raise or lower the plunger 80, thereby adjusting the orifice 72. After the adjustment is made, the bolt 87 is tightened against the spring washer 88 and the adjustment is thereby held. In order to make the connection between the shaft 82 and the bolt 85 secure, the shaft 82 is also provided with a re-entrant arm 90, the front portion 91 of which is bent over into surface-to-surface relation with the face plate 84 to provide an arm which may be readily grasped for movement and which may terminate in the pointer 92 moving along the scale 93 indicating the degree of adjustment.

The setting here shown at f in Figure 6 is that for the shortest time delay possible. Similarly the orifice of dashpot 49 is adjusted by the same kind of plunger connected to the bent portion 181 of shaft 182 which shaft 182 terminates in adjusting means corresponding exactly to the adjusting means 83, 85, 87, 90 previously described for shaft 82.

A portion of this adjusting means comprising the crank arm 183 corresponds to crank arm 83 as shown in Figure 6.

The lower ends of each of the springs 39 and 40 is connected to the re-entrant portion 100 of the through shaft 101 (Figure 6). Rotation of shaft 101 will raise or lower re-entrant portion 100 thereof. Each shaft 101 is connected in exactly the manner previously described for shafts 82 and 182 to the arm 103 and pointer 104 corresponding to arm 91 and pointer 92 for shaft 82 and the adjustment when made by movement of the arm 103 and bolt 105 along the slot 106 is held secure by tightening of bolt 105.

Thus, the time delay device is fully adjustable in the field. Adjustment of pointers 103 adjusts the respective springs 39 and 40 for their respective release points. Adjustment of pointers 91 for shafts 82 and 182 respectively adjusts the respective orifices of dashpots 45 and 49 to vary the long time delay and short time delay respectively. Adjustment of the nut 52 adjusts for the instantaneous trip point by changing the compression of spring 26.

Figure 7:
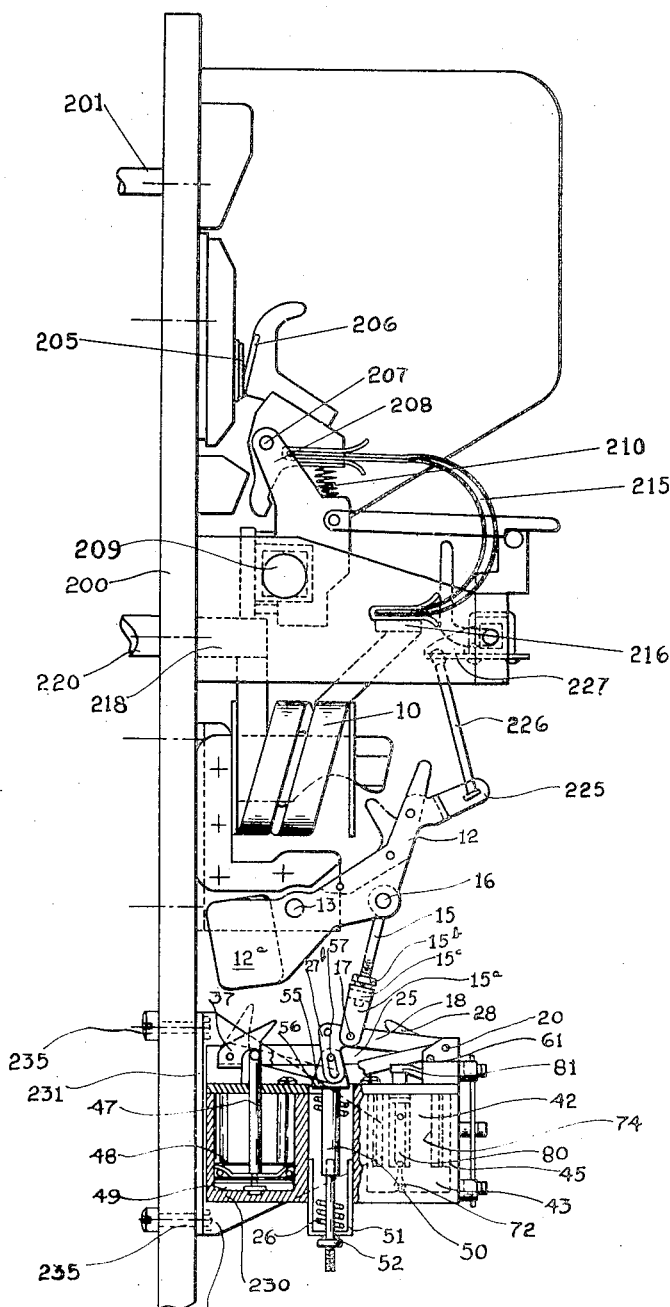
Figure 7 is a general side view of a circuit breaker showing the manner in which my novel time delay device is secured thereto.

In Figure 7 I have shown the manner in which my time delay device may be secured to cooperate with a circuit breaker. The circuit breaker may be of the type shown in Patents Nos. 2,348,228 and 2,375,328 or may be a simplified circuit breaker of the type here shown schematically. The circuit breaker here shown is mounted on an insulated panel 200. It has an upper back connection stud 201 connected in any appropriate manner to the stationary contact 205.

The movable contact 206 which engages the stationary contact 205 is essentially an L-shaped member pivotally mounted at 207 on the contact arm 208 which rotates on the contact shaft 209. Compression spring 210 between the contact arm 208 and the contact 206 drives contact 206 into current carrying engagement. Opening springs and operating mechanism, not shown, may be provided respectively to open and close the breaker.

The movable contact 206 is connected by the pigtail 215 to the terminal 216 of the series trip coil 10, the opposite end of which is connected to the terminal 218 which in turn is connected to the lower back connection stud 220. The armature 12 is provided with an extension 225 which will move the trip arm 226 on the tripper bar 227 when the armature moves to closed gap position with respect to the magnet 11, thereby tripping the circuit breaker.

It will be seen that the entire time delay device may readily be incorporated in connection with any type of circuit breaker construction and is simply mounted beneath the armature 12 and is connected thereby by the link 15. The entire housing 230 of the time delay device may readily be supported in any suitable manner on the panel 200 as, for instance, by the bracket 231 having the side panels 232 folded securely to the sides of housing 230, the bracket 231 being secured in any appropriate manner as, for instance, by the bolts 235 to the lower end of the panel 200.

In the foregoing I have described my invention solely in connection with a simplified preferred embodiment thereof. Since many variations and modifications of my invention should now be obvious to those skilled in the art, I prefer to be bound not by the specific disclosures herein contained but only by the appended claims.

I claim:

1. In a time delay mechanism for a circuit breaker trip apparatus having an armature mounted for a predetermined movement and a magnet for applying variable forces for effecting movement of said armature in one direction, a spring, a beam, a restraining member at each end of said beam for normally maintaining said beam against movement, a link pivotally connected at one end to said armature and at its other end through said spring to approximately the center of said beam, said spring forming a rigid connection from said armature to said beam when the forces applied to said armature by said magnet when energized is of a first predetermined value, and forming a flexible connection between said armature and said beam when the force applied to said armature by said magnet when energized is of greater than said first predetermined value, a first time delay connected to one end of said beam for permitting movement of said beam about the other end of said beam when said force applied to said armature by said magnet is a second predetermined force less than said first predetermined force and a second time delay connected to the other end of said beam for permitting movement of said beam about the first end of said beam when the force applied to said armature by said magnet is a third predetermined force less than said second predetermined force, one of said restraining means yielding in response to currents at less than said first-mentioned predetermined force.

2. In a time delay mechanism for a circuit breaker trip apparatus having an armature mounted for a predetermined movement and a magnet for applying variable forces for effecting movement of said armature in one direction, a spring, a beam, a member connecting said armature to approximately the center of said beam through said spring, said spring forming a rigid connection from said armature to said beam when the forces applied to said armature by said magnet when energized is of a first predetermined value, and forming a flexible connection between said armature and said beam when the force applied to said armature by said magnet when energized is of greater than said first predetermined value, a first time delay connected to one end of said beam permitting movement of said beam about the other end of said beam when said force applied to said armature by said magnet is a second predetermined force less than said first predetermined force and a second time delay connected to the other end of said beam for permitting movement of said beam about the first end of said beam when the force applied to said armature by said magnet is a third predetermined force less than said second predetermined force and a restraining member holding one end of said beam against movement and yielding in response to currents at less than said first-mentioned valves to release said beam for movement thereat.

3. In a time delay mechanism for a circuit breaker trip apparatus having an armature mounted for a predetermined movement and a magnet for applying variable forces for effecting movement of said armatuure in one direction, a beam, a restraining member at each end of said beam for normally maintaining said beam against movement, a resilient member connecting said armature to approximately the center of said beam, a first time delay connected to one end of said beam, the restraining member therefor yielding to permit movement of said beam about the other end of said beam when said force applied to said armature by said magnet is a predetermined force and a second time delay connected to the other end of said beam, the restraining member therefor yielding to permit movement of said beam about the first end of said beam when the force applied to said armature by said magnet is a predetermined force less than said first mentioned predetermined force.

HERBERT C. GRAVES, Jr.

REFERENCES CITED

The following references are of record in the file of this patent:

UNITED STATES PATENTS

| Number | Name | Date |
|---|---|---|
| 1,123,288 | Hellmund | Jan. 5, 1915 |
| 1,696,611 | McDonald | Dec. 25, 1928 |
| 1,764,382 | Ashbaugh | June 17, 1930 |
| 1,810,591 | Atwood | June 16, 1931 |
| 1,928,131 | Kuhn | Sept. 26, 1933 |
| 2,383,288 | Boden | Aug. 21, 1945 |
| 2,393,736 | Bennett et al. | Jan. 29, 1946 |
| 2,419,892 | Graves | Apr. 29, 1947 |
| 2,439,165 | Graves | Apr. 6, 1948 |